(12) United States Patent
Bettels

(10) Patent No.: US 9,074,924 B2
(45) Date of Patent: Jul. 7, 2015

(54) METAL-DETECTION CONVEYOR WITH BUILT-IN WEIGHING CELL

(71) Applicant: Mettler-Toledo Garvens GmbH, Giesen (DE)

(72) Inventor: Dirk Bettels, Harsum (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 309 days.

(21) Appl. No.: 13/857,243

(22) Filed: Apr. 5, 2013

(65) Prior Publication Data

US 2013/0270015 A1  Oct. 17, 2013

(30) Foreign Application Priority Data

Apr. 13, 2012  (EP) .................................... 12164091

(51) Int. Cl.
| | | |
|---|---|---|
| *G01G 11/00* | (2006.01) | |
| *G01G 21/28* | (2006.01) | |
| *G01G 19/387* | (2006.01) | |
| *G01G 19/03* | (2006.01) | |
| *G01G 19/52* | (2006.01) | |

(52) U.S. Cl.
CPC .............. *G01G 19/387* (2013.01); *G01G 21/28* (2013.01); *G01G 11/00* (2013.01); *G01G 19/03* (2013.01); *G01G 19/52* (2013.01)

(58) Field of Classification Search
CPC ....... G01G 19/03; G01G 21/28; G01G 11/00; G01G 11/003; G01G 11/006
See application file for complete search history.

(56) References Cited

U.S. PATENT DOCUMENTS

| | | | | |
|---|---|---|---|---|
| 5,304,745 | A * | 4/1994 | Rusk et al. ........................ | 177/50 |
| 7,060,913 | B2 * | 6/2006 | Nishiue et al. ................. | 177/145 |
| 7,307,225 | B2 * | 12/2007 | Berger ............................ | 177/119 |
| 7,432,455 | B2 * | 10/2008 | Berger et al. .................. | 177/119 |
| 2002/0157877 | A1 * | 10/2002 | Takahashi ...................... | 177/119 |
| 2004/0173388 | A1 * | 9/2004 | Nishiue et al. ................. | 177/145 |
| 2007/0207242 | A1 | 9/2007 | Carlsen | |

FOREIGN PATENT DOCUMENTS

| | | |
|---|---|---|
| EP | 0536288 B1 | 3/1995 |
| JP | 4-52521 A | 2/1992 |
| JP | 11-183240 A | 7/1999 |
| JP | 2009-109346 A | 5/2009 |

* cited by examiner

*Primary Examiner* — Randy W Gibson
(74) *Attorney, Agent, or Firm* — Standley Law Group LLP

(57) ABSTRACT

A combined weighing/metal-detection system comprises at least one support frame and at least two weighing cells arranged at mounting locations on the at least one support frame. A conveyor device rests on the weighing cells. The system further includes a metal detector with a passage opening, wherein the conveyor device passes through the opening. The at least two weighing cells are arranged, respectively, on opposite sides of the metal detector, preferably close to the upstream and downstream ends of the conveyor device. The metal detector is supported on the at least one support frame at mounting locations different from the mounting locations of the weighing cells, so that the weighing cells are not carrying the pre-load of the metal detector and the two functions of weighing and of detecting metallic contaminants can occur on the same at least one conveyor device close together in time.

20 Claims, 8 Drawing Sheets

METAL-DETECTION CONVEYOR WITH BUILT-IN WEIGHING CELL

This application claims priority under 35 U.S.C. §119 to European Patent Application No. 12164091.6, filed Apr. 13, 2012, which is hereby incorporated by reference in its entirety.

BACKGROUND AND SUMMARY OF THE INVENTION

Exemplary embodiments of the present invention relate generally to weighing systems and metal detection systems. More particularly, an exemplary embodiment of the present invention is directed to a combined weighing/metal-detection system and method, wherein a checkweighing scale is combined with a metal detector.

Checkweighing scales are a key element for quality assurance in the production of pharmaceutical or cosmetic products, food products, and beverages, as well as in the logistics, the chemical, auto parts, and metalworking industries. They not only improve the utilization of available resources, but also help in meeting national regulations, Weights & Measures requirements, and industry standards. An effective checkweighing system gives protection against product failures and lowers the overall operating costs.

A dynamic checkweigher is a system which determines the weight of articles while they are transported over a scale within a production line, which classifies the articles in accordance with predefined weight classes, and subsequently sorts or diverts the articles according to their respective classifications. Checkweighers are used in many diverse fields of application, including for example:

- checking articles for under or overweight;
- checking packaged goods for compliance with legal requirements regarding net weight of contents;
- reduction of product waste by using the weight values obtained from the checkweigher for the adjustment of the filling machines;
- classification of products according to weight;
- measuring and recording the performance of the production facility or production line; and
- parts count verification based on weight.

When checkweighers are used, 100% of the articles of a product line are weighed. In the process, all of the production data are collected for product counts, traceability of production lots, or production statistics.

A checkweigher normally consists of an infeed belt, weighing belt, discharge belt with sorting device, and a weighing terminal with a user interface. The weighing belt, which is arranged between infeed and discharge belt, rests on a weighing cell, which weighs the product as it travels over the weighing belt. The two most frequently used types of weighing cells for checkweighers are strain gauge load cells or weighing cells based on the principle of electromagnetic force compensation.

Like checkweighers, metal detectors are also among the key components for effective quality assurance. Metal detectors are employed by industrial users for the detection of contaminants in products, such as for example lead shot in meet, wire snips in grain, metal fragments from repairs on the production line, or contaminants picked up in the production process.

An industrial metal-detection system is a highly developed instrument serving to detect and sort out foreign bodies. The detection capability includes ferrous metals including high-grade steel, and non-ferrous metals such as brass, copper, aluminum and lead. A typical metal-detection system consists of four main components: sensor head, transport system, operating unit, and an automatic diverter system.

Sensor heads of the current state of the art fall primarily into two categories based on different detection technologies. A first category of sensor heads is equipped with symmetrical coils. Three coils are wound exactly parallel to each other on a non-metallic carrier body. The coil in the middle carries an alternating current of high frequency, thus generating an alternating magnetic field. The coils on either side act as receivers and, as a result of the symmetric arrangement, as long as no metallic contaminants pass through the detector, identical voltages are induced in the coils. If a product containing metallic contaminants passes through the coil arrangement, the high-frequency field is disturbed first in one receiver coil and then in the other. This causes transient changes of the induced voltage in the receiver coils, and the resultant signal can be processed to register the detection of the metallic contaminant.

The second category of sensor heads is used for the inspection of products in packages containing aluminum foil. The product that is to be inspected is exposed to a strong magnetic field whereby the metallic contaminant is magnetized. This magnetization is detected by way of a small voltage that is induced in a receiver coil. Sensor heads in this category have a significantly higher detection sensitivity for magnetic substances than for non-magnetic substances.

To protect the metal detector from being disturbed by interference due to metallic components or machines in the vicinity, the sensor head is enclosed and shielded in a metallic housing, normally of aluminum. The metallic housing also serves to enhance strength and rigidity and thus contributes significantly to the overall performance of the metal detector.

In spite of the shielding with a metallic housing, a part of the high-frequency magnetic field can escape from the opening of the metal detector to the outside and compromise the function of the metal detector, if the magnetic field is disturbed by metallic objects. To achieve optimal results with the metal detector, no metallic objects may be present within a certain range of the metal detector opening. This range is referred to as metal-free zone (MFZ). For a reliable product inspection this factor needs to be taken into account.

A metal detector of this kind and solutions to the aforementioned problems are described in EP 0 536 288.

For the in-motion weighing process, the weighing objects are preferably arranged in a uniform, repeatable manner, spaced apart at suitable regular intervals and in correct alignment. Thus, the checkweighing scale lends itself as the optimal platform in which to incorporate further inspection devices such as, for example, metal detectors.

Combined systems are more convenient to install and to operate. Furthermore, a combined system is in general more cost-effective than two systems that are purchased separately and then installed together in the production line. With a common entry of the article parameters on one operator panel for both parts of the combined system, the risk of operator errors can be reduced and change-overs between articles can be performed faster. In addition, costs for operator training, maintenance and cleaning are reduced.

At the current state of the art, checkweighing scales and metal-detection devices are arranged in separation from each other, following each other sequentially in a transport direction. For example in US 2007/0207242, a quality control system is described which consists of a detection unit for foreign objects and a weighing system. Both of these units of the quality control system have their own separate belt conveyors and are arranged in separation from each other in the quality control system. One operator unit serves to control both units of the system, which represents a big advantage to the user. Also, there is only one sorting device in the system, which removes products that are not meeting the prescribed quality assurance criteria of the system. These criteria can include weight tolerances or metallic contaminants. Other systems with separate units are described in JP 2009/109346 and JP 11 183 240. A big disadvantage of a separate arrangement is the long transport path through both units and the large amount of space required for it at the place of installation.

A system which likewise includes a metal detector, a weighing cell and a belt conveyor is disclosed in JP 4 052 521. The metal detector and the belt conveyor are mounted on the same chassis frame and are supported together by the weighing cell which, in turn, rests on a support frame on the floor.

According to EP 0536 288, a metal detector is equipped with a field-generating coil consisting in most cases of copper which, together with the metal housing, puts a lot of weight on the weighing cell. This so-called pre-load has a negative effect on the accuracy of weighing results, and the weighing cell has to be designed for a capacity that includes the weight of the metal detector. The pre-load, also referred to as tare, is that part of the weighing load which is not the object of the weight measurement, but which cannot be separated from the actual weight that is of interest. The consequence of this is that only articles above a certain minimum weight can be weight-checked.

An exemplary embodiment of the present invention may have the advantage of minimizing the amount of space required for a combined weighing/metal-detection system. An additional advantage may be to provide optimal measuring conditions for the weighing cells of the check-weighing scale, so as to optimize on the one hand the accuracy of the weight measurements and on the other hand the design of the weighing cell.

An exemplary embodiment of the invention may provide a combined weighing/metal-detection system which comprises at least one support frame through which the weighing/metal-detection system is supported on the floor, further at least two weighing cells which provide the weight value and which are arranged at mounting locations on the at least one support frame, and at least one conveyor device which, in the operating mode of the weighing/metal-detection system, rests on the weighing cells. The weighing/metal-detection system further comprises a metal detector with a passage opening, wherein the conveyor device is arranged to pass through the opening of the metal detector. Relative to the transport direction of the conveyor, the at least two weighing cells are arranged, respectively, on opposite sides of the metal detector, preferably close to the upstream and downstream ends of the conveyor device. The metal detector is supported on the at least one support frame at mounting locations different from those of the weighing cells, so that the weighing cells are not carrying the pre-load of the metal detector and the two functions of weighing and of detecting metallic contaminants can occur on the same conveyor device close together in time.

By supporting the metal detector directly on a support frame, separately from the support of the conveyor device, the pre-load on the weighing cells is significantly reduced. In contrast to the solutions of the known art, the weight of the metal detector no longer contributes to the pre-load. The weight of the metal detector, which previously rested on the weighing cells as a constant base load, is no longer of concern, so that special design measures to achieve a light-weight metal detector have become unnecessary. Due to the lower pre-load, the weighing cells used in systems of the known art can be replaced by at least two weighing cells that are matched to the new pre-load conditions. The resolution, i.e., the ability to discriminate between two closely adjacent measurement values, is thereby increased.

Due to the fact that the conveyor device is supported separately from the metal detector, by way of weighing cells on a support frame, vibrations caused by the operation of the conveyor device are damped in their propagation to the support frame.

The detection performance of the metal detector is improved in comparison to those known art designs where the conveyor device and the metal detector together rest on the load cells which are mounted on the support frame.

Since the conveyor device on which the articles are weighed extends through the metal detector, the operations of weighing and of detecting metallic contaminants can occur simultaneously during the passage of the weighing object over the conveyor device. The overall length of a combined weighing/metal-detection system is thus significantly shortened.

According to a further developed embodiment of the invention, the metal detector and the conveyor device are supported through separate mounting locations on one and the same support frame. By using a common support frame, the amount of space required is minimized and when the system is installed at the operating location, the alignment and the attachment to the floor are simplified.

In an advantageous further developed embodiment of the invention, the support frame has dedicated mounting locations for the attachment of a metal detector and at least two dedicated mounting locations for the attachment of weighing cells which, in turn, are arranged so that they can receive the conveyor device. The weighing system and the metal-detection system are supported separately through their respective mounting locations on the same support frame. The metal detector is centrally mounted midway on the support frame, and the conveyor device is mounted on at least two weighing cells, which are preferably arranged at the opposite outer ends of the support frame. The separate support arrangement allows the pre-load on the weighing cells to be reduced by the weight of the metal detector. The arrangement and use of two or more weighing cells further offers cost savings, as fewer weighing cells need to be installed, for example, with narrow conveyor belts or if the articles are always positioned in the middle of the conveyor belt, in other words, in any applications where the weighing cells are not subject to the problem of eccentric loading.

In a further embodiment of the invention, the metal detector is supported through mounting locations on a first support frame, and the conveyor device is supported through at least two further mounting locations on a second support frame that is separate from the first support frame. This means that the conveyor device has a support frame of its own, and the metal detector likewise has a support frame of its own through which it is supported on firm ground. With separate support frames, the propagation of vibrations from the drive mechanism of the belt to the metal detector is minimized. The arrangement and use of two or more weighing cells further offers cost savings, as fewer weighing cells need to be installed, for example, with narrow conveyor belts or if the articles are always positioned in the middle of the conveyor belt, in other words, in any applications where the weighing cells are not subject to the problem of eccentric loading.

According to another preferred embodiment of the invention, the second support frame comprises a first partial support frame and a second partial support frame, wherein each partial support frame includes at least one mounting location for a weighing cell.

In a further embodiment of the invention, the metal detector is mounted on a first support frame, while the second support frame is designed to support the conveyor device on the housing of the metal detector. The combined unit of metal detector and conveyor device can thus be disconnected from the mounting locations of the metal detector on the support frame and replaced by another such unit. This facilitates the exchange of the combined weighing/metal-detection system in case the production line has to be changed over to a product of significantly different weight and size.

In a further embodiment, the first partial support frame and the second partial support frame are tied together by a transverse connection.

Another preferred embodiment of the invention is distinguished by the fact that several conveyor devices run parallel to each other through the metal detector. An arrangement of several conveyor devices running parallel to each other through the metal detector not only increases throughput but also reduces the purchase costs of a system. Since the production costs for a metal detector of smaller dimensions are not proportionally lower, there is a relative cost disadvantage for a weighing/metal-detection system for smaller articles. This disadvantage can be overcome by selecting a metal detector of larger dimensions with a plurality of conveyor devices running through the same metal detector.

Each conveyor device in such an arrangement may rest on at least two weighing cells, so that weight checks can be performed separately on each conveyor device. The metal detection may be closely synchronized with the weighing at the time when the weighing object on the conveyor device passes through the metal detector. The arrangement and use of two or more weighing cells further offers cost savings, as fewer weighing cells need to be installed, for example, with narrow conveyor belts or if the articles are always positioned in the middle of the conveyor belt, in other words, in any applications where the weighing cells are not subject to the problem of eccentric loading.

In an advantageous further embodiment of the invention, the conveyor device is supported by three weighing cells representing a three-point support. A statically determined support which rests on at least one support frame and is safe from tipping over increases the accuracy of the weight measurement, for example, by minimizing eccentric load errors.

In another preferred embodiment of the invention, the conveyor device is configured with four weighing cells arranged at the corners of the conveyor device. In the case of a wide conveyor belt, a weighing object positioned off the middle of the belt, transverse to the transport direction, can introduce a torque in the weighing cells and thereby compromise the measurement. With an arrangement of four weighing cells at the corners of the conveyor device, this problem can largely be eliminated.

According to a particularly advantageous development of the inventive concept, the metal detector is arranged midway between the ends of the conveyor device in the transport direction. In view of the metal-free zone (MFZ), the centered arrangement of the metal detector relative to the conveyor device allows the length of the latter to be minimized relative to the transport direction. Given that only one product at a time may be present on the conveyor for the weighing, this has the advantage that the cycle period is shortened, as the weighing objects travel through the weighing/metal-detection systems at closer intervals, so that the throughput is increased.

In a further advanced embodiment of the invention, a diverter system downstream of the weighing/metal-detection station is configured to remove those objects that are not in conformance with the given criteria in regard to weight tolerances or content level of metallic contaminants. In comparison to a solution with a separate checkweigher and metal-detector, the cost of one diverter system can thus be saved.

According to another embodiment of the invention, the conveyor device includes a conveyor body and a belt looping around the conveyor body for the transport of objects.

According to yet another preferred embodiment of the invention, the conveyor device is positioned so that it passes through the metal detector near the bottom corners of the opening. The reason for this is that the detection sensitivity is weakest at the geometrical center of the opening and strongest in the peripheral areas.

In addition to the novel features and advantages mentioned above, other benefits will be readily apparent from the following descriptions of the drawings and exemplary embodiments.

BRIEF DESCRIPTION OF THE DRAWINGS

The invention is hereinafter explained on the basis of preferred embodiments that are illustrated in the attached drawings, wherein.

DETAILED DESCRIPTION OF EXEMPLARY EMBODIMENT(S)

Exemplary embodiments of the present invention are directed to a combined weighing/metal-detection system. Features with the same function and analogous design are hereinafter identified by the same respective reference symbols.

Figure 1:
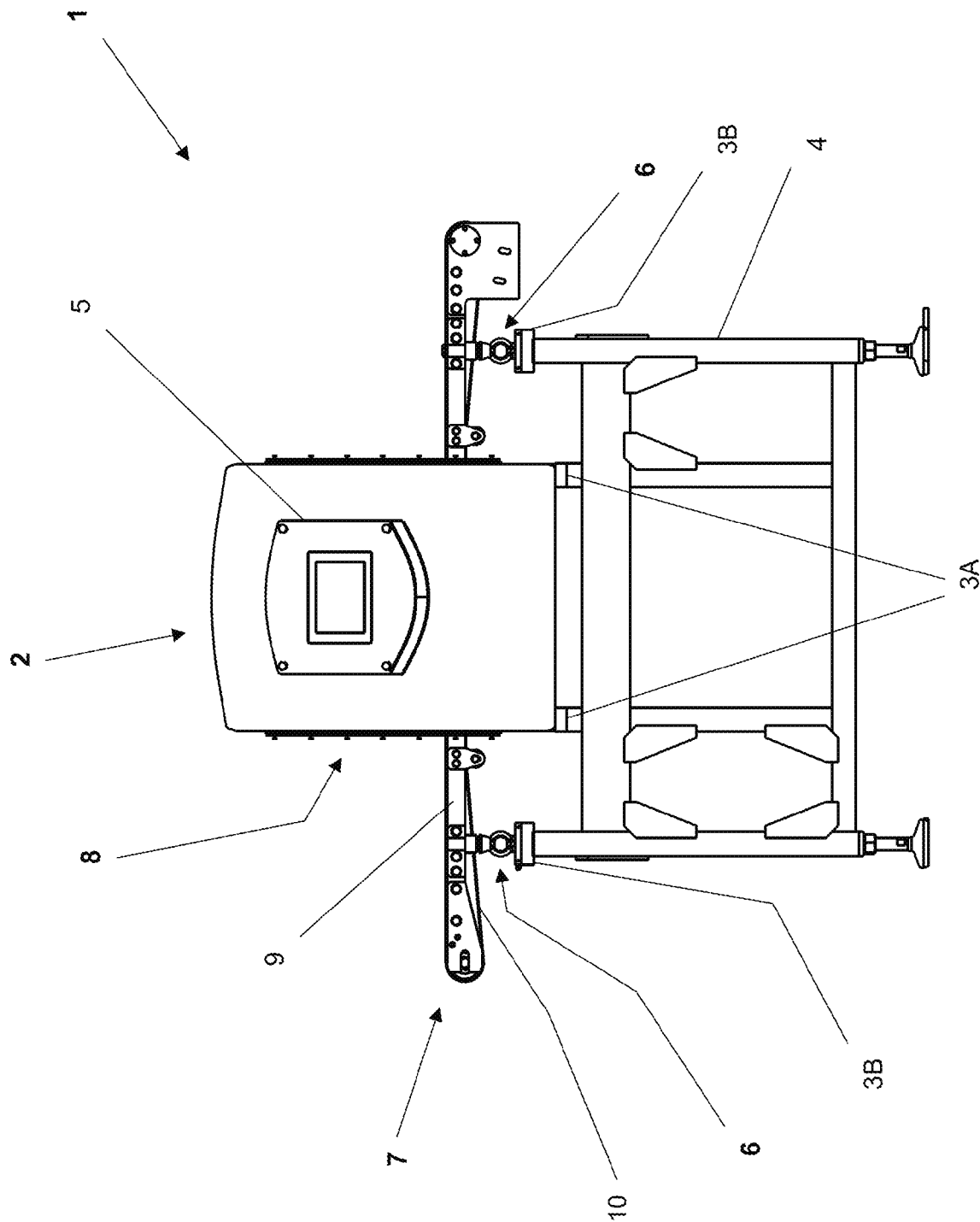
FIG. 1 represents a combined weighing/metal-detection system in a frontal view.

FIG. 1 shows a combined weighing/metal-detection system 1 in frontal view, as it normally presents itself to a user. A metal detector 2 is normally attached directly to a support frame 4 by way of at least two mounting locations 3A, and its weight is thus taken up by the floor. To both sides of the metal detector 2, the support frame 4 has a total of at least two mounting locations 3B for the attachment of weighing cells 6. The conveyor device 7 rests on the weighing cells 6. In such an arrangement, the stationary part of a weighing cell 6 is connected to the support frame 4, while the movable part of the weighing cell 6 is connected to the conveyor device 7. The conveyor device 7 includes a conveyor body 9 with rollers arranged close to the entry- and exit ends of the conveyor 7 and a belt 10 which is held under tension by two rollers. A large radius of the rollers leads to a large gap between the transport surfaces of belts that follow each other in the conveyor line. To ensure a reliable transfer of an object from one belt to the next, the problem can be solved by using an idling roller in addition to the drive rollers or by so-called knife edges. With a knife edge, the belt is directed around a ledge with a very small radius, and the belt is driven by a separate drive roller. However, the conveyor device can be realized in different ways, as long as it serves the purpose of transporting objects through the metal detector 2.

While the weighing object travels the length of the transport path of the conveyor device 7, the weighing is performed by taking the sum of the weighing signals of the at least two weighing cells 6. In an exemplary embodiment, the weighing and the detection of metallic contaminants in the metal detector 2 may occur close together in time. A diverter system, not shown here, can remove the weighing object from the conveyor device 7 if it fails the given criteria regarding weight tolerances and/or the presence of metal contaminants.

In order to attain an optimum level of performance from the metal detector, there must be no metallic objects within a certain range around the opening 8. This range is referred to as the metal-free zone (MFZ). The size of the metal-free zone depends on the height of the opening 8, the type of detector, and the operating sensitivity of the metal detector 2. Stationary metal objects can be placed closer to the metal detector 2 than moving metal objects, as stationary objects affect the magnetic field to a lesser degree. The field of detection is that spatial range within the magnetic field of the metal detector 2 in which even the slightest unacceptable metallic contamination can be measured and detected. The illustrated metal detector 2 has a field of detection that is symmetric to both sides and is therefore set up midway between the ends of the conveyor device 7 in order to keep the length of the latter as short as possible. If the metal detector 2 had an asymmetric field of detection, one would therefore select the position of the metal detector 2 in relation to the conveyor device in accordance with the field of detection, so that the conveyor device 7 and the field of detection are approximately matched to each other in their respective reach up and down the conveyor path, and/or that the combined weighing/metal-detection system can be kept as short as possible in the conveyor direction and/or that stationary or movable metal objects will not cause a reduction in operating sensitivity.

Figure 2:
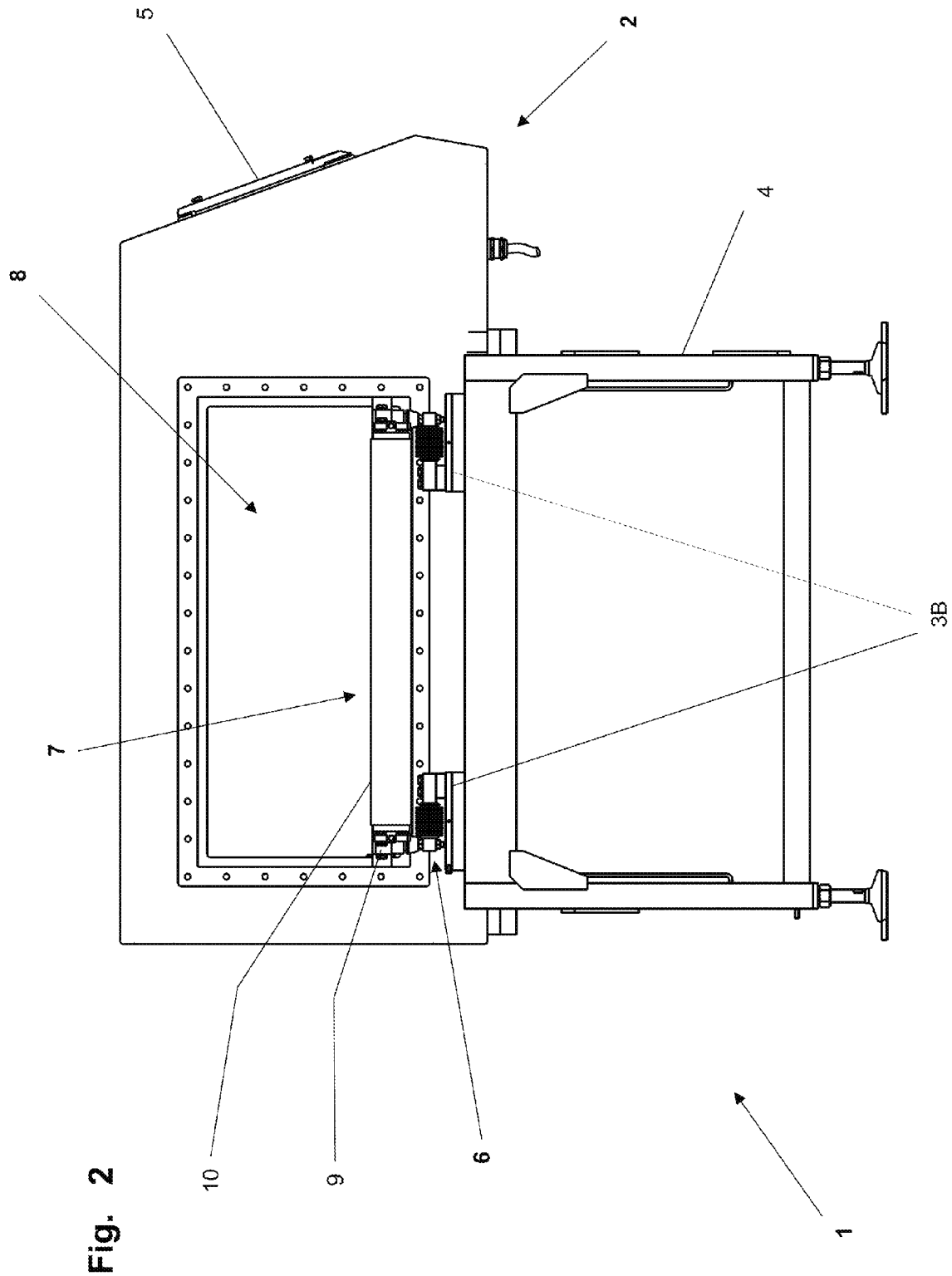
FIG. 2 represents a combined weighing/metal-detection system in a lateral view.

In FIG. 2, the system is shown in sideways orientation, so that the passage opening 8 of the metal detector 2 is brought into view with the conveyor device 7 passing through the opening 8. Metal detectors 2 with a large opening 8 have lower detection sensitivity than metal detectors with a small opening. The horizontal as well as the vertical width of the opening 8 have an influence on the detection sensitivity. In a typical metal detector 2, the detection sensitivity is weakest at the geometric center of the opening 8 and strongest in the peripheral areas. The conveyor device 7 is therefore arranged close to the bottom corners of the opening 8.

Figure 3:
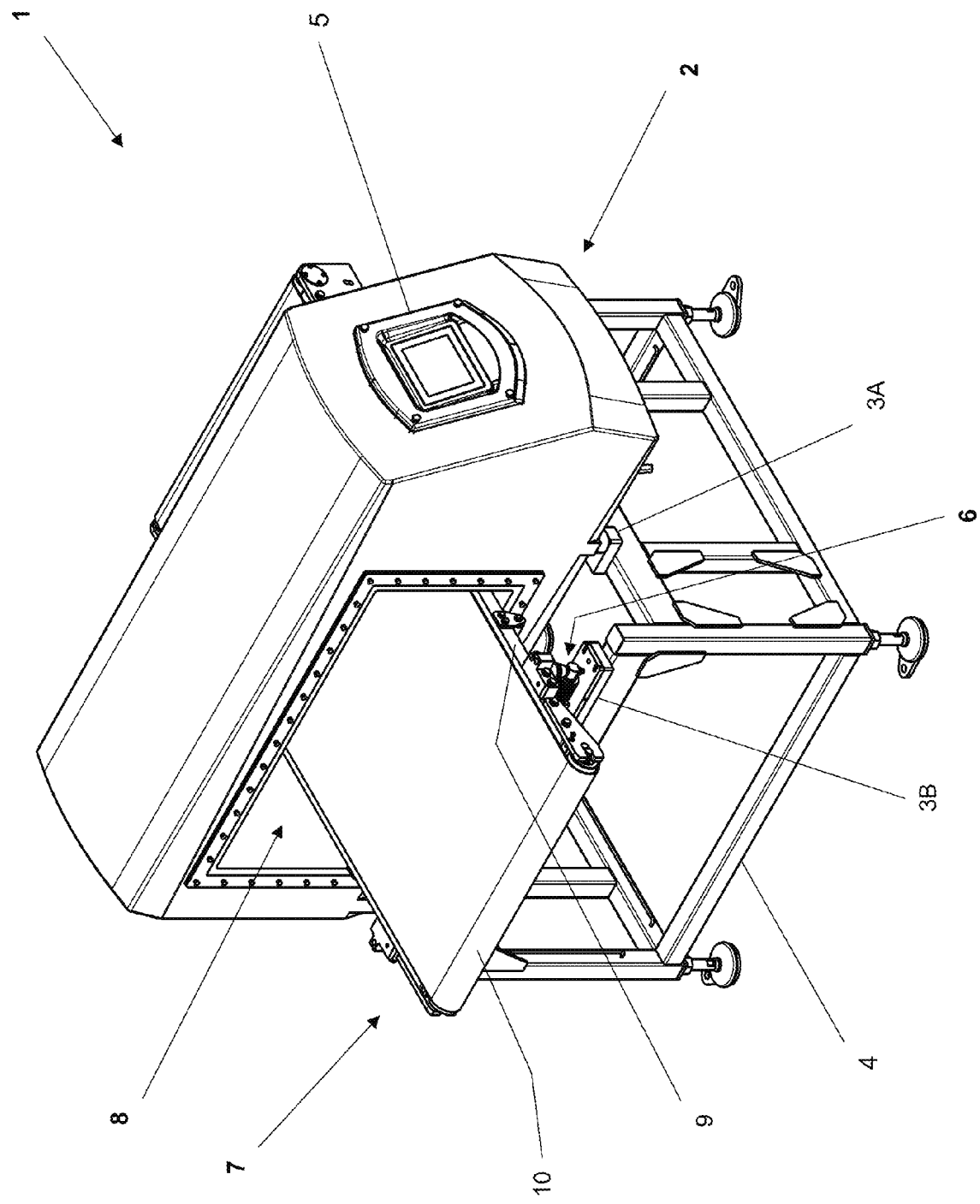
FIG. 3 represents a combined weighing/metal-detection system in an isometric view.

FIG. 3 shows the weighing/metal-detection system 1 in an isometric view. A close look at the lower right-hand corner of the opening 8 reveals that the conveyor device 7 and the metal detector 2 have no contact with each other, but that both units are supported independently of each other through respective mounting locations 3A and 3B on a support frame 4. Thus, only the weight forces of the weighing object and the conveyor device are acting on the weighing cells 6. In comparison to the conventional state of the art, the smaller pre-load achieved with an exemplary embodiment of the invention allows the use of weighing cells 6 with a lower load capacity which provide a finer resolution of the measurement signal.

Figure 4:
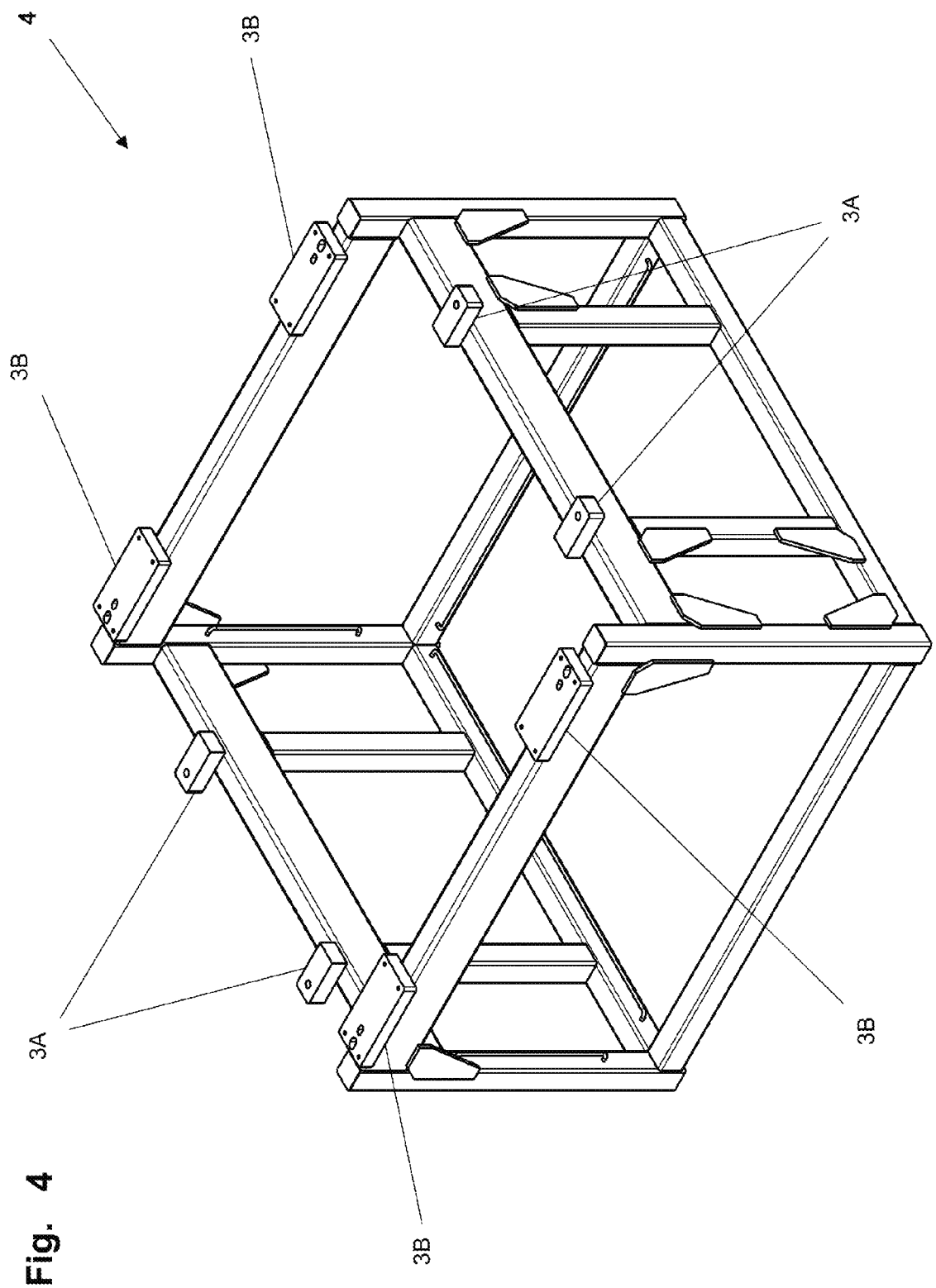
FIG. 4 represents a support frame for a combined weighing/metal-detection system with four mounting locations for the belt conveyor in an isometric view.

The support frame 4 of FIG. 4 has four mounting locations 3A for the installation of the metal detector 2 and, in addition, four further mounting locations 3B. The latter serve for the attachment of the weighing cells 6 which, in turn, support the conveyor device 7. For a relatively wide conveyor device 7, it is advantageous if weighing cells 6 are arranged at the four corners of the support frame 4, so as to minimize measurement errors that could be caused by weighing objects positioned off the middle of the belt, transverse to the conveyor direction. Such a measurement error could be caused, for example, by a torque entering into the weighing cells 6.

Figure 5:
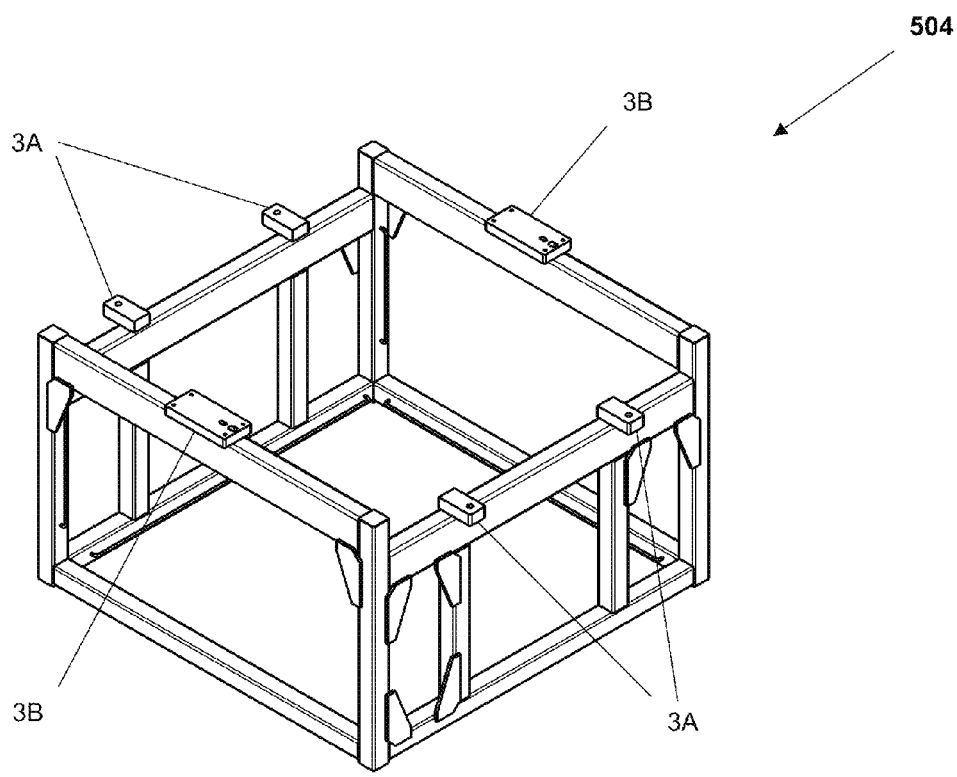
FIG. 5 represents a support frame for a combined weighing/metal-detection system with two mounting locations for the belt conveyor in an isometric view.
Figure 6:
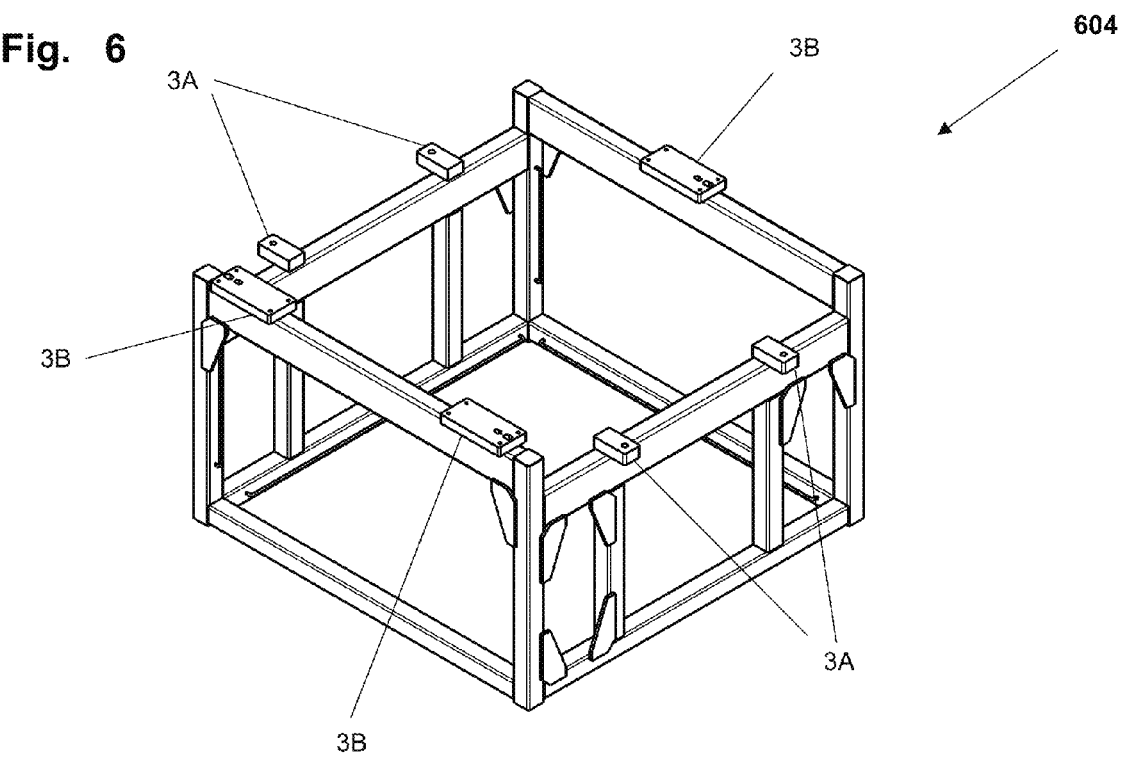
FIG. 6 represents a support frame for a combined weighing/metal-detection system with three mounting locations for the belt conveyor in an isometric view.

FIGS. 5 and 6 show support frames 504, 604 with different numbers of mounting locations 3B for the weighing cells 6. In a first embodiment, the support frame 504 has two mounting locations 3B. If the conveyor device 7 is relatively narrow, an arrangement with only one mounting location 3B on each side of the metal detector 2 is adequate. Thus, a broader width of the support arrangement is traded in favor of a lower-cost design. The arrangement of FIG. 6 has three mounting locations 3B forming a three-point support. The result is a statically determined support which supports the conveyor device 7 on the support frame 605 and keeps it safe from tipping over. This example illustrates a way to save the cost of one weighing cell.

Figure 7:
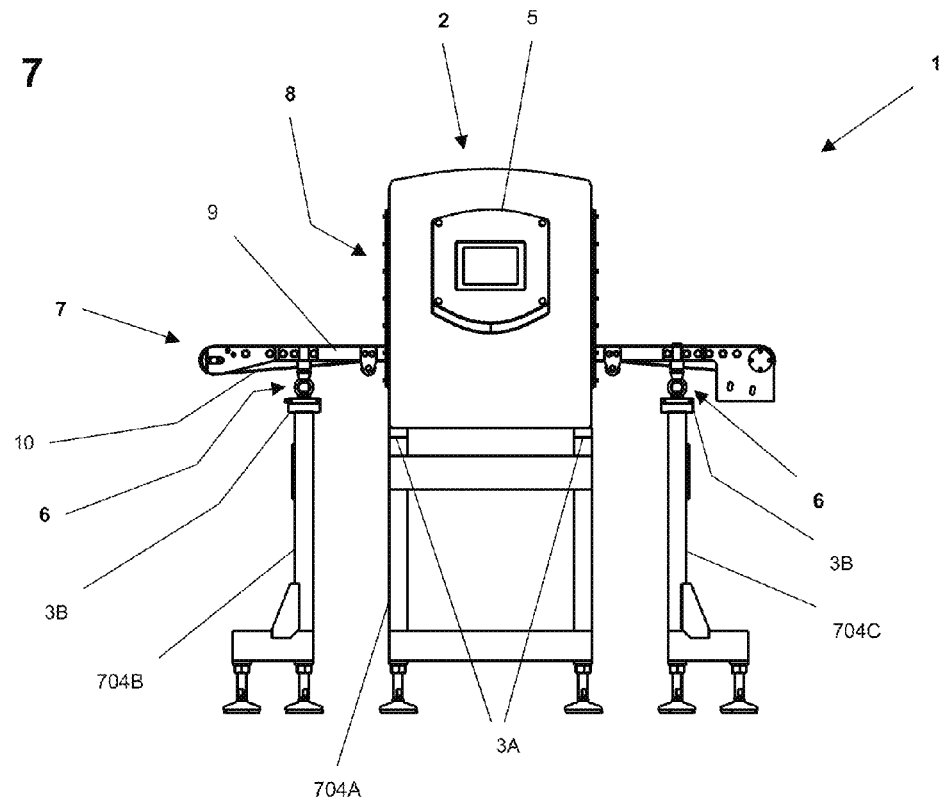
FIG. 7 represents, in frontal view, a combined weighing/metal-detection system, wherein the conveyor has a two-part support frame that is separate from the support frame of the metal detector.
Figure 8:
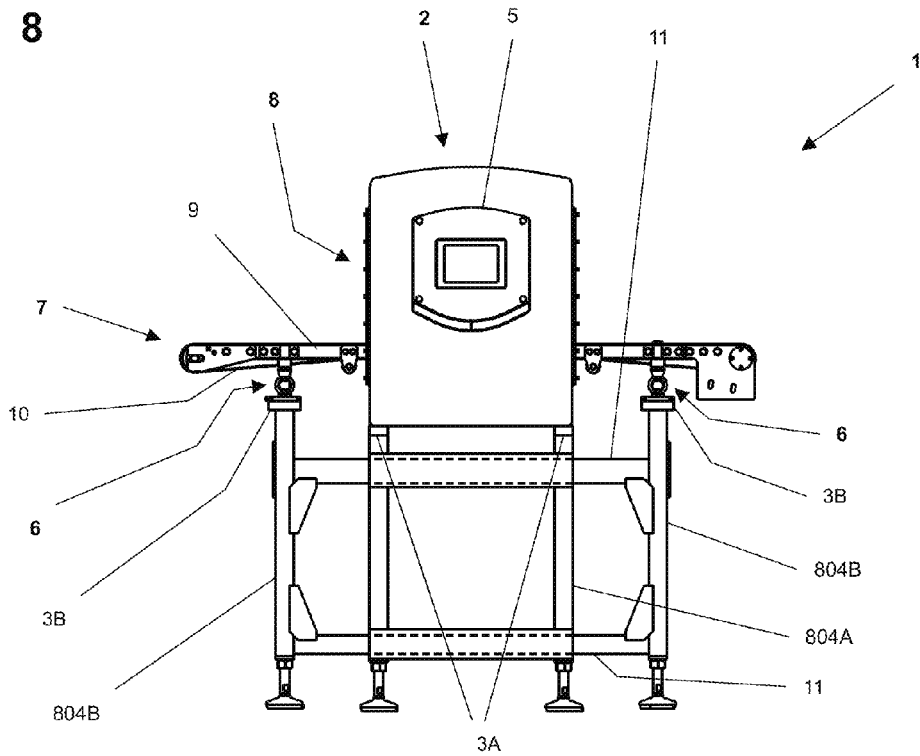
FIG. 8 represents, in frontal view, a combined weighing/metal-detection system, wherein the conveyor has a one-piece support frame that is separate from the support frame of the metal detector.

Further embodiments of the support frame are illustrated in FIGS. 7 and 8. Their distinguishing trait is that the support frame is divided into at least two parts carrying, respectively, either the metal detector 2 or the conveyor device 7. The first support frame 704A bears the weight of the metal detector 2 through the mounting locations 3A and transmits the weight force into the floor. The conveyor device 7 is supported by two further, partial support frames 704B and 704C. All three of the support frames 704A, 704B, 704C are designed without a connection to each other. The two end supports of the conveyor device 7 in FIG. 8 are connected by transverse braces 11 which are arranged, for example, so that they run outside the first support frame 804A of the metal detector, thus forming the second support frame 804B which transmits the weight of the conveyor device 7 to the floor. Both versions offer the advantage that the conveyor system 7 cannot transmit shocks or vibrations to the metal detector 2 through a common support frame. Further advantages of these configurations will present themselves depending on the specific situation at the place of installation or the operating requirements such as exchangeability and serviceability of the conveyor system 7.

Figure 9:
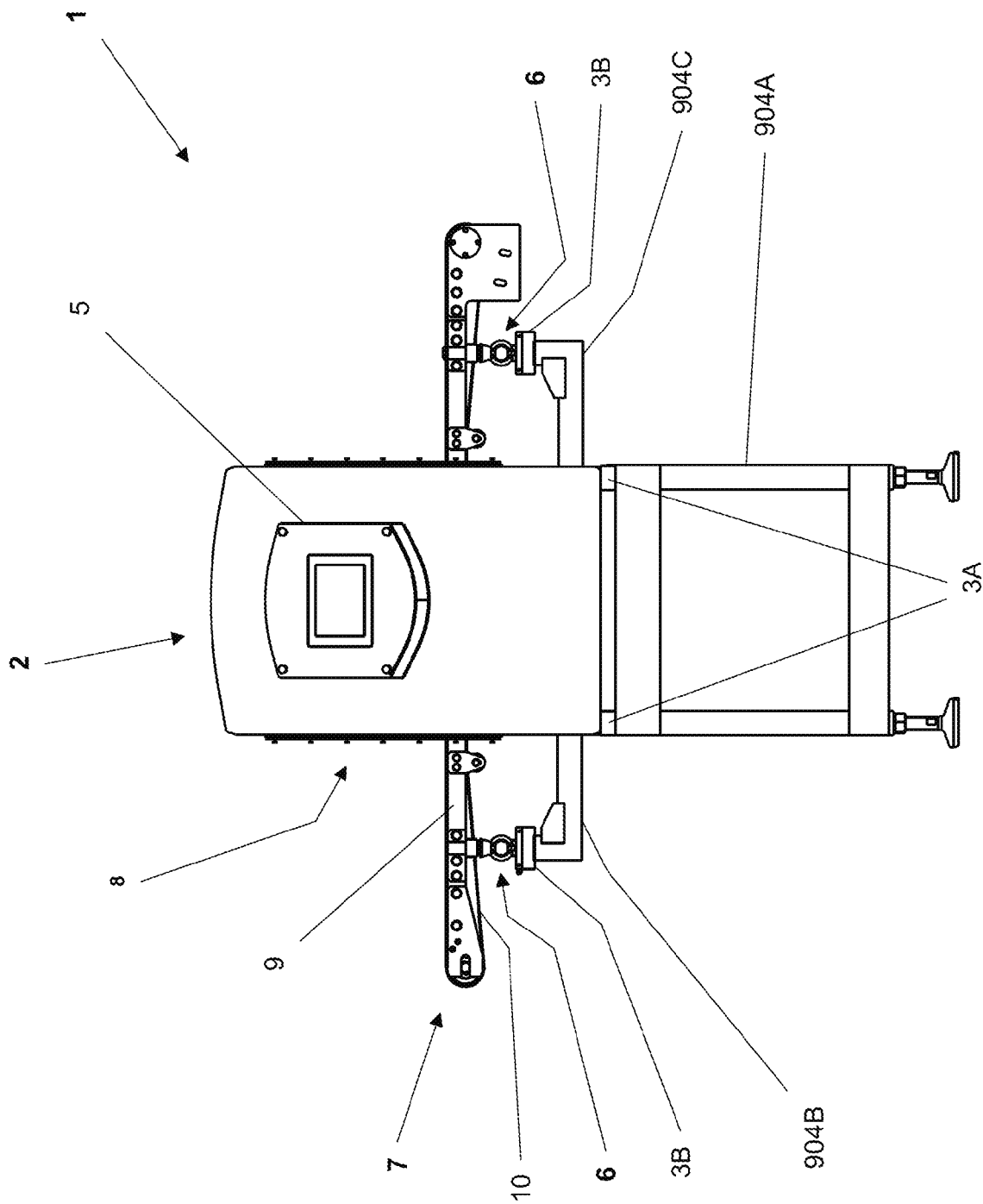
FIG. 9 represents, in frontal view, a combined weighing/metal-detection system, wherein the conveyor has a two-part support frame that is attached to the housing of the metal detector.

In the arrangement of FIG. 9, the conveyor device 7 is mounted directly on the housing of the metal detector 2 by way of partial support frames 904B and 904C. The metal detector 2, in turn is supported by a first support frame 904A which stands on the floor. If the production line needs to be converted to a product of significantly different size and weight, the metal detector 2 can be taken off the mounting locations 3A and replaced together with the conveyor device 7.

Figure 10:
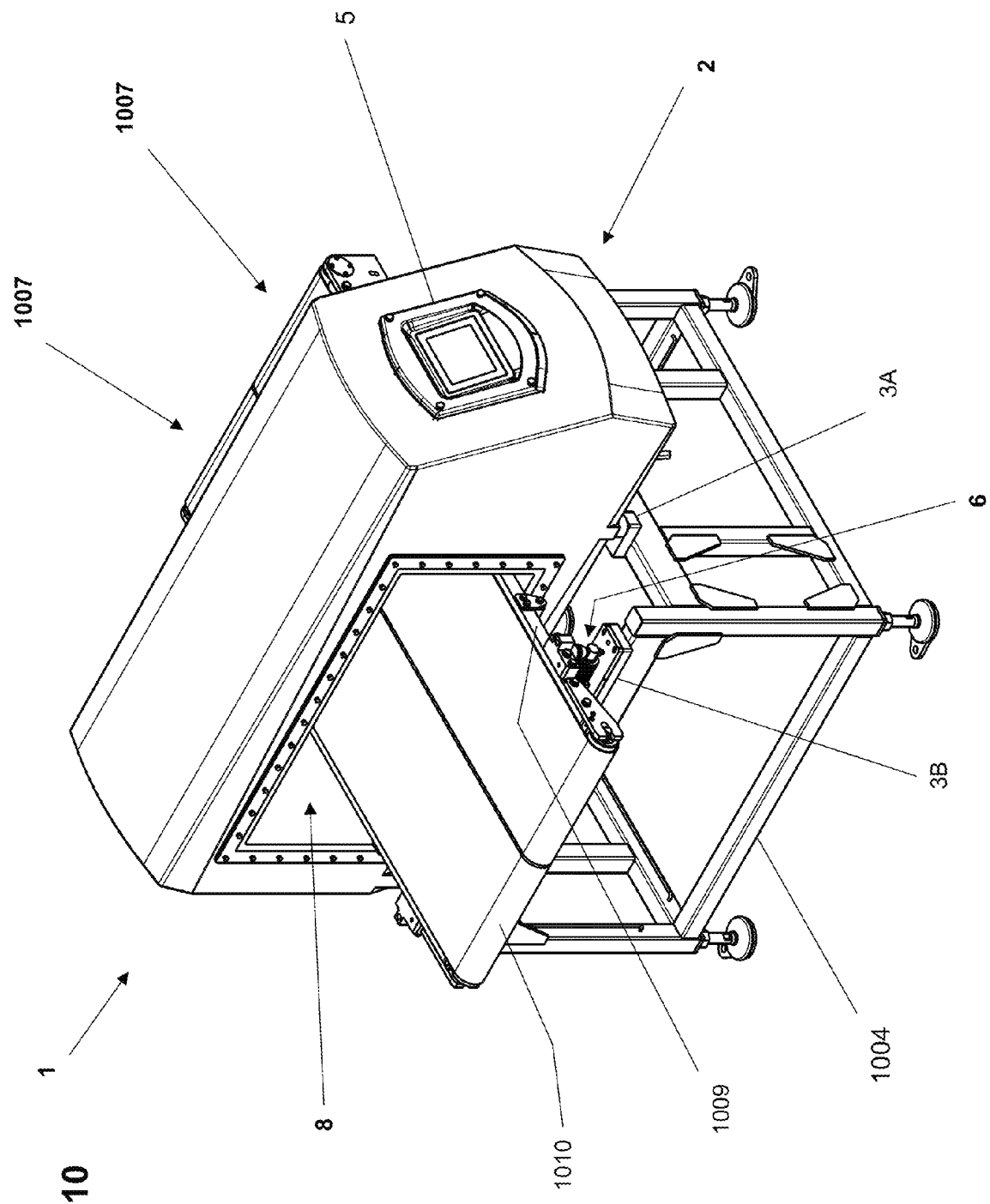
FIG. 10 represents, in isometric view, a combined weighing/metal-detection system, schematically illustrating two conveyor devices extending parallel to each other through the metal detector.

FIG. 10 schematically illustrates how a plurality of conveyor devices 1007 can be arranged in a system. In the illustrated design configuration, the support frame 1004 has for each of the conveyor devices 1007 two mounting locations 3B for the weighing cells 6. The two conveyor devices, which are supported by the load cells and are not connected to each other, allow two parallel streams of articles to be weighed and transported through the metal detector, with the two functions of weighing and of detecting metallic contaminants occurring close together in time. Not shown in FIG. 10 are the diverter systems which are located downstream to sort out those weighing objects which fail to meet the given criteria regarding weight tolerances and/or the presence of metallic contaminants. As the conveyor devices 1007 are driven independently of each other, it is possible to operate them at different belt speeds. Also conceivable are applications where the conveyor devices 1007 carry articles of different nominal weight through the same metal detector 2.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Although the invention has been described by presenting specific examples of embodiments, it is considered self-evident that numerous further variants could be created based on the teachings of the present invention, for example, by combining the features of the individual embodiments with each other and/or interchanging individual functional units between the embodiments. As such, any embodiment of the present invention may include any of the optional or preferred features of the other embodiments of the present invention. Many of those variations and modifications will provide the same result and fall within the spirit of the claimed invention.

What is claimed is:

1. A combined weighing/metal-detection system comprising:
    at least one support frame through which the combined weighing/metal-detection system is adapted to be supported on a floor;
    at least two weighing cells which are arranged at mounting locations on the at least one support frame;
    at least one conveyor device which, in an operating mode of the weighing/metal-detection system, rests on the weighing cells;
    a metal detector with a passage opening, wherein the at least one conveyor device is arranged to pass through the opening of the metal detector;
    wherein relative to a transport direction of the at least one conveyor device, the at least two weighing cells are arranged, respectively, on opposite sides of the metal detector; and
    wherein the metal detector is supported on the at least one support frame at mounting locations different from the mounting locations of the at least two weighing cells, such that the at least two weighing cells do not carry a pre-load of the metal detector and functions of weighing and of detecting metallic contaminants are adapted to occur on a same one of the at least one conveyor device.

2. A combined weighing/metal-detection system according to claim 1, wherein the metal detector and the at least one conveyor device are supported through separately located mounting locations on a same one of the at least one support frame.

3. A combined weighing/metal-detection system according to claim 2, wherein the at least one support frame comprises the mounting locations for attachment of the metal detector and the mounting locations for attachment of the at least two weighing cells, wherein the latter are arranged to support the at least one conveyor device.

4. A combined weighing/metal-detection system according to claim 1, wherein the metal detector is supported by way of the mounting locations on a first of the at least one support frame, and the least one conveyor device is supported by way of the mounting locations on a second of the at least one support frame, which is separate from the first of the at least one support frame.

5. A combined weighing/metal-detection system according to claim 4, wherein the second of the at least one support frame comprises a first partial support frame and a second partial support frame, wherein each of the partial support frames respectively comprises the mounting location for one of the at least two weighing cells.

6. A combined weighing/metal-detection system according to claim 5, wherein the first partial support frame and the second partial frame are connected to each other by a transverse brace.

7. A combined weighing/metal-detection system according to claim 1, wherein:
    the metal detector rests on a first of the at least one support frame; and
    a second of the at least one support frame serves to support the at least one conveyor system and is arranged on housing of the metal detector.

8. A combined weighing/metal-detection system according to claim 1, wherein a plurality of the conveyor devices run parallel to each other through the metal detector.

9. A combined weighing/metal-detection system according to claim 8, wherein each of the conveyor devices is supported by at least two of the weighing cells, such that weight determinations are capable of being performed separately on each of the conveyor devices.

10. A combined weighing/metal-detection system according to claim 1, wherein the at least one conveyor device rests on three of the weighing cells by way of a three-point support arrangement.

11. A combined weighing/metal-detection system according to claim 1, wherein the at least one conveyor device rests on four of the weighing cells arranged, respectively, at four corners of the conveyor device.

12. A combined weighing/metal-detection system according to claim 1, wherein the metal detector is arranged midway between ends of the conveyor device in the transport direction.

13. A combined weighing/metal-detection system according to claim 1, further comprising a diverter system downstream of the weighing/metal-detection location configured to remove objects that are not in conformance with a given criteria in regard to weight tolerances or content level of metallic contaminants.

14. A combined weighing/metal-detection system according to claim 1, wherein a respective one of the at least one conveyor device comprises at least one conveyor body and a belt looping around the at least one conveyor body for transportation of objects.

15. A combined weighing/metal-detection system according to claim 1, wherein the at least one conveyor device is positioned so that it passes through the metal detector near the bottom corners of the opening.

16. A combined weighing/metal-detection system according to claim 1 wherein the at least two weighing cells are close, respectively, to upstream and downstream ends of the at least one conveyor device.

17. A combined weighing/metal-detection system according to claim 1 wherein the functions of weighing and of detecting metallic contaminants are adapted to occur close together in time.

18. A combined weighing/metal-detection system adapted to perform functions of weighing and of detecting metallic contaminants, the system comprising:
   at least one support frame;
   at least two weighing cells which are arranged at mounting locations on the at least one support frame;
   a conveyor device configured to rest on the weighing cells; and
   a metal detector with a passage opening, wherein the conveyor device is arranged to pass through the opening of the metal detector, the metal detector supported on the at least one support frame at mounting locations different from the mounting locations of the at least two weighing cells;
   wherein relative to a transport direction of the conveyor device, the at least two weighing cells are arranged, respectively, on opposite sides of the metal detector.

19. A combined weighing/metal-detection system according to claim 18 wherein the at least two weighing cells are close, respectively, to upstream and downstream ends of the conveyor device.

20. A combined weighing/metal-detection system according to claim 18 wherein the system is adapted to synchronize the functions of weighing and of detecting metallic contaminants.

\* \* \* \* \*